United States Patent
Cash

(10) Patent No.: US 11,040,353 B1
(45) Date of Patent: Jun. 22, 2021

(54) ELECTROSTATIC AIR FILTER USED TO DESTROY PATHOGENS AND VIRUSES WITH INFRARED HEAT

(71) Applicant: James T. Cash, Hackettstown, NJ (US)

(72) Inventor: James T. Cash, Hackettstown, NJ (US)

( * ) Notice: Subject to any disclaimer, the term of this patent is extended or adjusted under 35 U.S.C. 154(b) by 0 days.

(21) Appl. No.: 16/991,503

(22) Filed: Aug. 12, 2020

(51) Int. Cl.
| | |
|---|---|
| *B01D 53/02* | (2006.01) |
| *B03C 3/155* | (2006.01) |
| *B03C 3/36* | (2006.01) |
| *B03C 3/47* | (2006.01) |
| *B03C 3/88* | (2006.01) |
| *F24F 8/10* | (2021.01) |
| *F24F 8/192* | (2021.01) |

(52) U.S. Cl.
CPC .............. *B03C 3/155* (2013.01); *B03C 3/361* (2013.01); *B03C 3/47* (2013.01); *B03C 3/88* (2013.01); *F24F 8/10* (2021.01); *F24F 8/192* (2021.01)

(58) Field of Classification Search
CPC ........... B03C 3/155; B03C 3/361; B03C 3/47; B03C 3/88; F24F 3/1603; F24F 3/166
See application file for complete search history.

(56) References Cited

U.S. PATENT DOCUMENTS

| | | | | |
|---|---|---|---|---|
| 4,652,318 A | * | 3/1987 | Masuda | B03C 7/04 |
| | | | | 156/89.19 |
| 2006/0172639 A1 | * | 8/2006 | Yamada | B01D 39/1623 |
| | | | | 442/59 |
| 2010/0255560 A1 | * | 10/2010 | Call | C12M 45/22 |
| | | | | 435/243 |
| 2011/0203931 A1 | * | 8/2011 | Novosselov | G01N 1/2202 |
| | | | | 204/600 |
| 2012/0116589 A1 | * | 5/2012 | Schneider | G05B 15/00 |
| | | | | 700/274 |
| 2012/0274933 A1 | * | 11/2012 | Doucette | G01N 15/0612 |
| | | | | 356/301 |

\* cited by examiner

*Primary Examiner* — Christopher P Jones

(57) ABSTRACT

A novel device which can ensure safe and effective elimination of collected pathogens and avoid secondary toxins. The device is suitable for installation into various HVAC and air handling equipment to rid the air of dangerous viral agents. The destruction of pathogens is guaranteed by heating collecting surfaces sufficiently. Complete direct line of sight of the lamp to the filter is not required as is with UV light.

11 Claims, 2 Drawing Sheets

ELECTROSTATIC AIR FILTER USED TO DESTROY PATHOGENS AND VIRUSES WITH INFRARED HEAT

CROSS-REFERENCE TO RELATED APPLICATIONS

Not Applicable

STATEMENT REGARDING FEDERALLY SPONSORED RESEARCH OR DEVELOPMENT

This invention was not made with government support. The government does not have certain rights in the invention.

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

The Held of the invention—apparatus for capturing and destroying airborne pathogens including COVID-19. As the world laces another pandemic from novel viruses that transmit from person to person via airborne droplets, there is a need to capture and destroy these pathogens in a reliable and energy efficient manner. Droplets containing viruses can be captured in media filters or with electronic cleaners utilizing electrostatic forces. Media filters such as HEPA Filters can be very effective for capture of these small particles but come with three disadvantages: 1) High initial pressure drop that only increases over time, 2) limited ability to destroy the pathogens that are trapped in the filter, and 3) need to frequently replace filters, t his novel device ensures safe and effective elimination of collected pathogens while also avoiding secondary toxins. Many studies have been performed on the use of ultraviolet light to destroy pathogens within ventilation systems. Results point to difficulties demonstrating adequate dosing of light to completely inactive contaminated particles.

BRIEF SUMMARY OF THE INVENTION the inventive solution utilizes electrostatic forces to collect airborne droplets and particles onto metal surfaces, preferably copper, that are periodically heated to above 250 degrees Fahrenheit in order to destroy pathogens held on the collection surfaces. The processed gas flow is interrupted to at least a portion of the collecting surface while the surfaces are heated with a targeted infrared light source. The method of gas flow interruption is done without disruption of the electrostatic forces used to restrain the particles on the collecting surface. Unlike ultraviolet light which does not have a direct measurement of effectiveness, heating the collecting surfaces provides sufficient proof of complete sanitization. The spread of heat through conduction is more efficient in killing viruses and bacteria compared to the direct line of sight that is required with UV light. In addition, infrared waves do not produce secondary hazards such as ozone.

The invention is a device suitable for installation into various HVAC and air handling equipment to rid the air of dangerous viral agents. The destruction of pathogens is guaranteed by the process because complete direct line of sight is not required with infrared healings as is with UV light.

BRIEF DESCRIPTION OF THE SEVERAL VIEWS OF THE DRAWING

FIG. (1) is a side view of the traveling infrared lamp and stationary reflectors with the lamp.

FIG. (2) is a side view with the infrared lamp and hood positioned over the collector along with a traveling reflector.

DETAILED DESCRIPTION OF THE INVENTION

Figure 1:
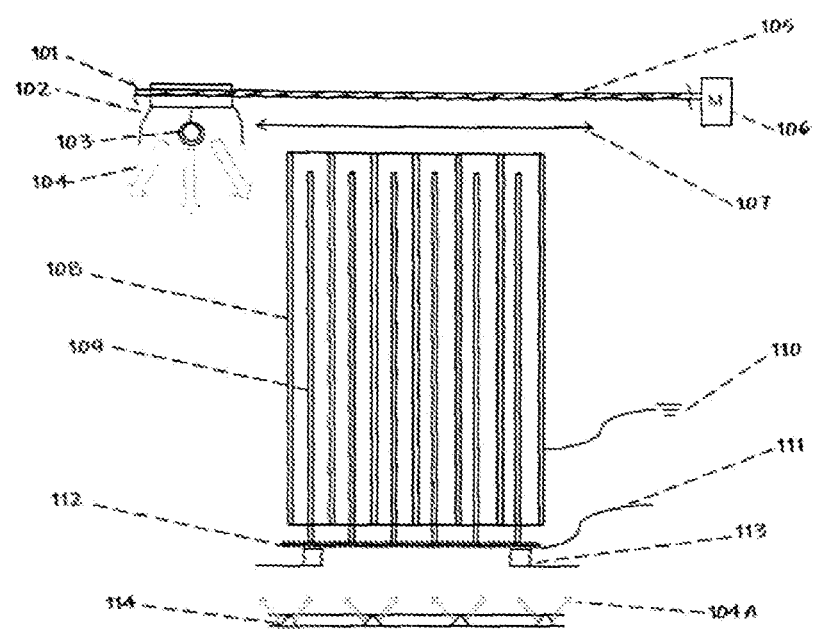
Figure 2:
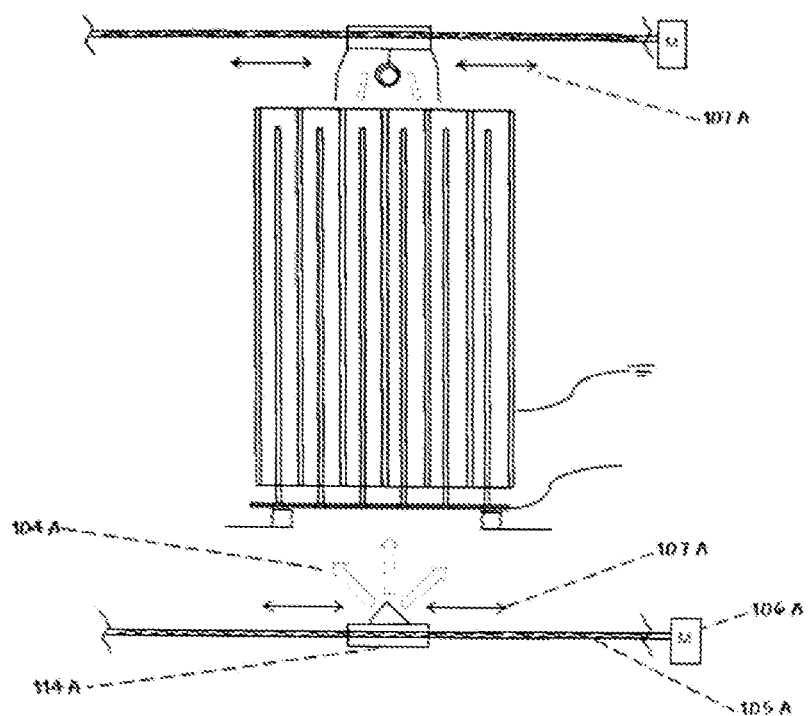

Numerous issues must be taken into consideration in order to efficiently purify indoor air of contaminated pathogens. One challenge is treating the tremendous volume. According to the Commercial Buildings Energy Consumption Survey (CBECS) of 2012, the USA alone has 87 billion square feet of commercial floor space, not including residential or manufacturing space (CBECS. 2015). An average ceiling height of 10 feet yields 870 billion cubic feet of air, or 58 billion cubic feet of air per minute to treat given the minimum requirement of four air changes per hour. Reliable and efficient air filtration systems are required to cleanse and meet, the ever increasing indoor air quality standards. HEPA style filters and electrostatic filters are currently the best technologies to capture fine particles and droplets, so both were considered and compared. HEPA style filters have fibrous filter media and must be replaced at least twice a year to remain efficient. Electrostatic filters, on the other hand, do not need replacement but benefit from a periodic washing of the collecting surfaces. A factor of increasing importance is the environmental impact of manufacturing and maintaining such equipment. These filter systems must use energy in the most efficient manner, minimize disposable waste, and be available to meet the demand. During the Covid-19 pandemic in 2020, shortages of face masks quickly caused panic among health care workers, nursing homes and places of essential business. The risk of material shortages and excessive waste are both likely problems if HEPA filters are used as the primary filtration in commercial and residential HVAC systems for the purpose of reducing the spread of viruses. With an air to filter ratio of 4 to 1 (Turner, 1998, p, 1-24), the 58 billion cubic feet per minute of air requires 14.5 billion square feet of filter area. This totals 29 billion square feet of material per year to change filters every six months—over 1,040 square miles of filter material. An electrostatic filter manufactured of durable materials does not need replacement and therefore has a much lower impact on the environment. When comparing electrical consumption of HEPA fillers with electrostatic precipitators (ESP), there is typically an inch water column less pressure drop for electrostatic systems than HEPA filters. Electrostatic precipitators have very little pressure drop, approximately 0.5 inches of water column. While this pressure difference of 1 inch water column appears somewhat insignificant, the total energy consumed by the ventilation fans used to move the air through the filter systems becomes substantial at these large flows. Assuming a fan efficiency of 75%, a flow of 58 billion cubic feet per minute, and a one inch reduction of pressure drop results in a 12 million horsepower reduction which is equivalent to approximately 9 million kilowatts of electricity. The fan law for power was used in the calculation shown below;

$$BHP = ACFM \times \text{static pressure}/\text{fan efficiency} \times 6356 =$$
$$58{,}000{,}000{,}000 \; ACFM \times 1 \text{ inch w.c}/(0.75 \times 6356) =$$
$$58{,}000{,}000{,}000 / 4767 = 12.2 \text{ million horsepower}$$

Electrostatic air filters are therefore the preferred method to capture and eliminate airborne pathogens because they utilise a low pressure drop and are non-disposable. The inlet air laden with droplets and particles that may contain pathogens can be efficiently collected by adding an electrical charge to them. The difference in charge from the grounded or oppositely charged collecting surfaces draws the unwanted droplets out of the air stream and onto the collecting surface. Once collected, the particulate and droplets remain on the surface due to the electrostatic forces. This retention provides the opportunity to destroy pathogens trapped on the surface.

The two basic, types of electrostatic filters, also referred to as electrostatic precipitators, are classified as single stage and two stage collectors. Single stage collectors have the high voltage electrodes within the collecting plates or tubes and two stage collectors having a set of charging plates followed by collecting plates which are oppositely charged. The described invention can be applied to either style but for the purposes of the figures and description a single stage collector will be used. The spacing of the plates, or size of the tubes can vary significantly as well as the voltages applied which are determined by the electrode style and collector spacing. In one embodiment as represented in FIGS. (1) and (2), the collector has 1 inch square tubes with an electrode consisting of a ⅛th inch threaded rod and an applied voltage of positive 8 to 12 kv applied to the electrode and the collecting surfaces are grounded. A positive charge is provided to produce positively charged ions as doing so results in much lower generation of ozone. An array of 6 by 6 tubes are shown in FIG. (1) with a cross sectional area of 0.5 square feet. A face velocity of 200 to 600 feet per minute is typical for the collector, treating 50 to 150 cubic, foot per minute (cfm). An ESP can treat a wide range of volumes of air by increasing the size of the collecting tubes or plates as needed. The power supply or transformer rectifier (TR) is sized to provide sufficient capacity to teed to the electrodes. It may be practical to use more than one ESP module as air flows increase, with each module having its own power supply.

Once the particles or droplets are captured, the contaminated pathogens need to be inactivated in a safe, reliable, and energy efficient manner. With electrostatic precipitators (ESP) as the choice of filter and collection method, the particles and droplets remain in place and can be sanitised by: 1) chemical cleaning, 2) ultraviolet light and/or 3) heating by infrared light. Commercial systems, particularly hi the food services industry, use electrostatic filters to collect oils and droplets and then periodically dose with ultraviolet (UV) lamps to purify or decontaminate the collected material. The disadvantages of UV include the containment of mercury contained in the bulbs, the potential generation of ozone and the uncertainty of knowing if all surfaces have received sufficient dosage of UV light. Any particles in a shadow (outside of the direct line of sight of the UL light source) or out of the prescribed range would not be treated sufficiently by the UV light. In addition, the exact intensity and duration of UV light exposure required to guarantee complete neutralization of a virus like Covid-19 is unknown, and even with this information it may prove difficult to obtain and certify neutralization on a continuous basis. Chemical disinfectants were also considered. Using disinfectants or chemical cleaners would require a means to store and evenly dispense to the collecting surfaces and therefore require frequent attention. Secondary concerns include odors, allergic reactions and ability to prove continuous effectiveness when considering that pathogens mutate.

The relationship between heat and viral removal has been studied with Covid-19. The virus can survive several days at temperatures below room temperature, but at 160 degrees Fahrenheit are undetectable in under one hour. As the temperature increases the time to neutralize pathogens shortens and surfaces heated above 250 degrees Fahrenheit have nearly instantaneous neutralization. The use of sufficient heat is a non chemical method of sterilizing any surface capable of withstanding the elevated temperature.

> "Higher temperatures and humidity also tend to result in other coronaviruses dying quicker, although research has shown that a related coronavirus that causes Sars could be killed by temperatures above 56° C. or 132° F. (hotter than even a bath scalding enough to cause injury) at a rate of about 10.000 viral particles every 15 minutes" (Gray. 2020).

> "However, at 70 degrees Celsius, they found the virus was inactivated in five minutes" (Osborne, 2020).

However, just adding high temperature to the electrostatic filter inlet is not practical in HVAC systems as air passing through the collector would also be heated which greatly increases the energy required. Therefore it is most advantageous to provide the heat with the air motionless. Items 302 and 103 in both FIGS. (1) and (2) display one embodiment of the invention that incorporates a moving infrared light and reflector hood across the surface of the collecting plates. The hood moving in concert with the infrared light source blocks air flow through that portion of the collection system. It should be noted that the infrared light and hood combined provide two critical aspects of killing the virus and conserving energy: 1) the infrared light provides energy to heat the collecting surface without heating the air and 2) the exposure time determines the surface temperature which in turn guarantees destruction of the pathogen. It is important that the grounded surfaces of the infrared light and hood are maintained far enough away from the electrodes to avoid short circuiting of the electrical field while also being close enough to the collecting surfaces to effectively heat up a portion of the collecting surface. The rate of movement of the lamp controls the peak temperature of the collecting surfaces. Heat conduction within the collecting surfaces provides lethal temperature to all collecting surfaces within the area acted upon by the lamp, including the surfaces that do not have a complete line of sight to the infrared lamp. Polished reflectors (item 114) on the opposite side of the collecting tubes or places can be used to redirect light (item 104) passing through the collector and send it back to the collecting plates (item 108). Shrouding the lamp with a reflective hood achieves greater energy efficiency because it redirects the light through the collecting surface while it seals against the collecting surface effectively blocking air flow through that section of the collector. Very little heat is lost to the air stream when the infrared light impacts the collecting surfaces. It however, the air was allowed to pass through and over the collecting surfaces the metal would act as a heat exchanger transferring much of the heat to the air. Infrared is able to pass through air without heating it, but the objects the infrared light comes in contact, with can in turn heat the air.

As described above, the traveling infrared-emitting light and hood does not need to be applied to the entire collecting surface at once. By design it focuses its output on 5 percent to 25 percent of the collector when in use resulting in minimal impact to the temperature change across the electrostatic filter as well as minimizes energy consumption demanded by the infrared heater. The infrared treatment does not have to be continuous and may be applied at an interval frequent enough to prevent breakthrough of pathogens from the filter system.

"The researchers at NIH, however, did find that copper surfaces tended to kill the virus in about four hours" (Gray, 2020).

Most industrial electronic filters utilize smooth or polished metal plates, often constructed from aluminum or stainless steel, in one embodiment both these characteristics are modified to more efficiently utilize the infrared system. Infrared will reflect off of polished surfaces and in fact will have very little effect. Thus ideally the collecting surfaces would be dark in color and dull. Aluminum and stainless steel have a greater coefficient of expansion than carbon steel and thus may change more dimensionally when heated. Carbon steel alloys would be a better choice to reduce cost and expansion or contraction while still having the thermal conductivity required. Carbon steel alloys have the benefit of delivering the lethal heat to all surfaces without the need for a complete direct line of sight from the lamp or light reflectors. Another material choice for its high infrared absorption characteristics and anti-viral properties is copper. Covid can survive for days on stainless steel but only for three to four hours on copper (Gray, 2020). Copper also has a greater ability to absorb infrared light than many other metals and has a tremendous ability to transfer heat which is why it is often used to line the bottom of cookware. In simpler terms, if one area of copper is heated, the heat quickly spreads evenly to the remaining body of copper. A layer or coating of copper may also be used on top of a lower cost alloy.

As seen in FIG. (1), an infrared lamp mounted to a conveying system such as a screw drive moves the lamp slowly across the collecting surfaces. It should be apparent, to anyone skilled in the art that there are numerous methods of moving the lamp as well as numerous patterns or paths that the lamp can travel. It is not the intention to limit the invention to one particular method other than to demonstrate one system that achieves the desired results.

One enhancement, would be the addition of a reflector, item 114, as shown in FIG. (1). A reflector positioned strategically within the collection system can increase the rate of heating by redirecting lost infrared light back to the collecting surfaces, item 108. It is also possible to have a traveling reflector that follows the same motion of the IR lamp (item 103) and can share the same drive motor, as shown in FIG. (2). The benefits of infrared over ultraviolet light have been disclosed as the ability to provide sufficient dosage that requires only proof of temperature to verify surface sterilization. However, this invention does not preclude the use of ultraviolet light as a secondary method of eliminating pathogens as both UV and IR light can pass through air without substantially changing the temperature of the air. Ultraviolet light in the 200 to 280 nanometers is m effective germicide but has little ability to heat surfaces. Thus a (JVC light can be applied to all the collecting surfaces. Ozone generation can then be minimized by using positive charging electrodes and careful selection of materials. A polishing activated carbon filter may be employed downstream of the precipitator to further reduce the ozone level. In another embodiment, electrical power can alternate between the infrared purification lamp to tire ultraviolet light. This will reduce total amperage requirements of the device and provide two means of disinfecting the collecting surfaces.

Item 108 represents the electrostatic collecting surfaces and housing of the air filter, which is grounded via item 110. The collecting surfaces are heated from infrared light (item 104) and reflected infrared light (item 104 A) that are emitted front a source (item 103). Item 109 represents the high voltage electrodes that provide the positive ions which are fixed by a support grid (item 112) and insulated from ground by insulators (item 113). Item 111 represents the power supply to the high voltage grid and electrodes. A motor (item 106) and screw drives (item 105) control the motion (represented by item 107) of the infrared light source (items 102 and 103). Both the reflective hood (item 102) and any other reflective surfaces (item 114) redirect tight back at the collectors. Item 101 signifies a drawing break line, FIG. (2) shows a variation of the embodiment, with the light source, reflective hood, and the other reflective surface (item 114 A) moving in tandem (item 107 A). Items 165 A and 106 A represent an independent drive system that allows the reflective surface to travel in tandem with the reflective hood (item 102) and infrared source (item 103).

REFERENCES CITED

CBECS. (2015, Mar. 4). *A Look at the U.S. Commercial Building Stock: Remits from EIA's* 2021 *Commercial Buildings Energy Consumption Survey* (*CBECS*). U.S. Energy Information Administration. https://www.eia.gov/consumption/commercial/reports/2012/buildstock/

Gray, R, (2020, Mar. 17). *Covid*-19*: How long does the coronavirus last on surfaces*? BCC Future. https://www.bbc.com/future/article/20200317-covid-19-how-long-does-the-coronavirus-last-on-surfaces Nagy, J. (2019, Apr. 8). *How to Get the Right Air to Cloth Ratio*. U.S. Air Filtration. Inc. https://www.usairfiltration-.com/how-to-get-the-right-air-to-cloth-ratio/

Osborne, H. (2020, Apr. 15). *Coronavirus Can Survive High Temperatures for Long Periods, Study Finds*. Newsweek, https://www.newsweek.com/coronavirus-heat-kill-virus-1498074

Turner, j. E L, McKenna. J, D., Mycock, J. C., Nunn, A. B., & Vatavuk, W. M. (1998). Chapter 1 Baghouses and Filters, 1.3.1. Gas-to-Cloth Ratio. *Section 6, Particulate Matter Controls*, page 124. ERA/452/B-02-001.

The invention claimed is:

1. An electrostatic filter for the collection of droplets and pathogens comprising at least one ionizing electrode, at least one collecting surface, an infrared source aimed at the at least one collecting surface, the at least one collecting surface designed to maximize absorption of infrared light, and a means to reduce air flow through said at least one collecting surface during cleaning when infrared light is applied.

2. An electrostatic air filter of claim 1 in which an electric motor is used to traverse the infrared light across the at least one collecting surface.

3. An electrostatic air filter of claim 1 wherein the electrostatic air filter is a single stage electrostatic filter, and the at least one collecting surface is square, rectangular, round, hexagonal, porous or a plate.

4. An electrostatic air filter of claim 1 wherein the electrostatic air filter is a two stage electrostatic filter, and the at least one collecting surface is square, rectangular, round, hexagonal, porous or a plate.

5. An electrostatic filter of claim 1 having at least one reflector surface to redirect infrared light, that has passed by the at least one collecting surface, back at the at least one collecting surface.

6. An electrostatic air filter of claim 1 in which the infrared light source travels in a circular path.

7. An electrostatic air filter of claim 1 in which an ultraviolet lamp is employed in addition to localized infrared heating from the infrared source.

8. An electrostatic air filter of claim 7 in which a flow-blocking plate travels in concert with the ultraviolet lamp to limit air flow through a portion of the at least one collecting surface being heated by the infrared source.

9. An electrostatic air filter of claim 1 in which the at least one collecting surface is treated to maximize infrared light absorption.

10. An electrostatic air filter of claim 1 in which the at least one collecting surface is made from or coated with copper.

11. An electrostatic air filter of claim 1 having a temperature sensor capable of reporting the temperature of the at least one collecting surface to verify proper operation.

\* \* \* \* \*